United States Patent [19]

Lia et al.

[11] Patent Number: 4,479,151
[45] Date of Patent: Oct. 23, 1984

[54] MAGNETIC RECORDING OF DIGITAL SIGNALS ON A MAGNETIC MEDIUM

[75] Inventors: Herman Lia, Li; Erik Solhjell, Oslo, both of Norway

[73] Assignee: Tandberg Data A/S, Oslo, Norway

[21] Appl. No.: 363,459

[22] Filed: Mar. 30, 1982

[30] Foreign Application Priority Data

Mar. 31, 1981 [DE] Fed. Rep. of Germany ....... 3112893

[51] Int. Cl.³ .............................................. G11B 5/09
[52] U.S. Cl. ........................................ 360/46; 360/45
[58] Field of Search ...................... 360/40, 45, 46, 51, 360/6

[56] References Cited

U.S. PATENT DOCUMENTS 3,333,247  7/1967  Hadley et al. ........................... 360/6

*Primary Examiner*—Vincent P. Canney
*Attorney, Agent, or Firm*—Hill, Van Santen, Steadman & Simpson

[57] ABSTRACT

Encoded digital information signals are magnetically recorded on a magnetic recording medium with the assistance of a magnetic head to which write current is supplied. As a function of the encoded information signals, a head change is carried out wherein the current applied to the magnetic head is changed from a first current value to a second current value and vice versa. After each head change, an amplitude of the write current is varied in stepwise amounts from the first or second current value, respectively, and wherein the number of steps depends on a chronological spacing of the head changes from one another. Distortions of resulting read signals are reduced given the method and apparatus of the invention.

10 Claims, 4 Drawing Figures

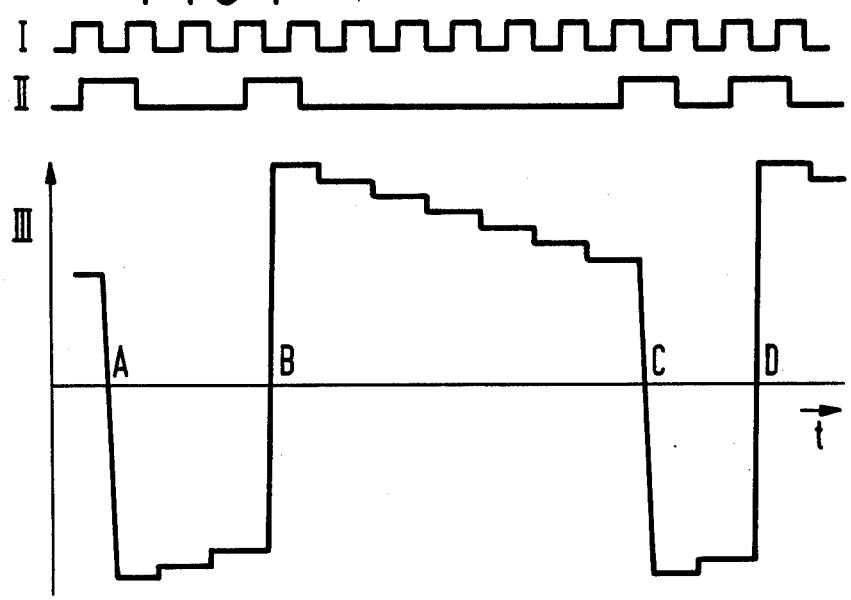
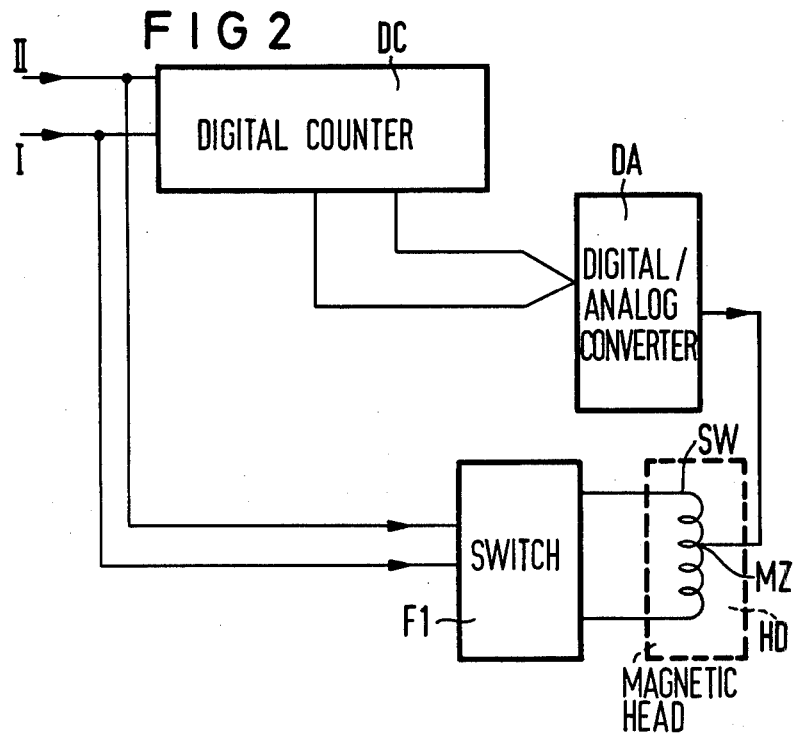

MAGNETIC RECORDING OF DIGITAL SIGNALS ON A MAGNETIC MEDIUM

BACKGROUND OF THE INVENTION

The invention relates to a method for the magnetic recording of encoded digital information signals on a magnetic recording medium with the assistance of a magnetic head to which a write current is supplied. As a function of the information signals, the head executes a change from a first current value to a second current value and vice versa. The invention also relates to a device for the implementation of the method.

The magnetic recording of encoded digital information signals on a magnetic recording medium, for example, on a magnetic tape, with the assistance of a magnetic head has been known for a long time. For this purpose, a write current is supplied to the magnetic head which, in accordance with the encoded digital information signals, carries out a change between a first current value and a second current value and vice versa corresponding to the employed encoding method. Accordingly, the current values are selected in such manner that the magnetic recording medium is brought to saturation. The number of changes between the current values (which is known as a "head change" in the following text) per digital information signal depends upon the employed encoding method. Such encoding methods derive, for example, from the U.S. Pat. No. 4,167,761, incorporated herein by reference. A circuit arrangement which generates a write current for a magnetic head is also disclosed in the aforementioned patent.

The magnetic recording medium, for example, a magnetic tape, is thus brought into one of two possible saturation states depending upon the employed encoding method, namely it is magnetized in one of two longitudinal directions. Accordingly, in all possible encoding methods, a problem exists that, given a change of the frequency of the head change and corresponding to the flux change on the magnetic recording medium, a low frequency component arises, namely in the areas in which a transition is made on the recording medium from low recording density (little flux change) to high recording density (great flux change) and vice versa. The result of these low frequency components is that the high frequency read signals picked up from the magnetic recording medium are shifted relative to a base line. The maximum amplitude of these low frequency components exists in the transition areas in which the frequency changes occur and prevents a correct information recognition.

The reason for this phenomenon is as follows: when the information signal is recorded in the recording medium, the remanent magnetization is a function of the wavelength and is lower for high recording densities. Independently of the mutual influence between the particles in the recording medium, the area with high remanent magnetization expands into the area with lower magnetization. This results in the fact that the magnetization pattern on the recording medium is distorted and this distortion appears as a low frequency component. This low frequency component affects the read signal to such an extent that the high frequency read signals are shifted in their position in the transition areas from lower to higher and higher to lower frequency in comparison to undistorted read signals.

In order to reduce the influence of such distortions, it is known to appropriately pre-emphasize or pre-distort the write current. As an example, see U.S. Pat. No. 4,167,761, German Auslegeschrift No. 21 11 744, and German Offenlegungsschrift No. 17 47 004, all incorporated herein by reference. Whenever, in accordance with the encoding method, a flux change is to be carried out on the magnetic recording medium, the write current for the magnetic head there is switched from a first current value to a second current value, i.e. a head change is undertaken and subsequently the write current is changed either in one step or continuously from the current value to a value lower in amplitude. This form of the write current and the magnetization of the recording medium corresponding to this form reduces the distortion of the read signals.

SUMMARY OF THE INVENTION

An object underlying the invention is to specify a method for generating a write current and a device for the implementation of the method in which the distortions of the read signals are even further reduced. Given a method of the aforementioned type, this object is achieved in that, after each head change, the amplitude of the write current is reduced in stepwise amounts from the first or, respectively, second value, whereby the plurality of steps depends on the chronological spacing of the head changes from one another.

Thus, the shape of the write current depends on the recording density, namely in such manner that the remanent magnetization of the recording medium now only slightly depends on the recording pattern. By means of reducing the amplitude of the write current in steps for lower recording densities, the remanence in the recording medium is likewise reduced. Therefore, the number of steps is lower for high recording densities than for lower recording densities. The result is that the base line for the read signals in the transition areas from low to high or from high to low recording density is no longer shifted relative to the normal case, i.e. the low frequency component is eliminated.

The write current whose amplitude after a head change is reduced in steps dependent upon the recording density is generated with the assistance of a device which contains a digital counter, a digital-to-analog converter, and a switching means. The encoded information signals and a write clock signal are supplied to the digital counter. At its output, the counter emits a digital output signal whose value is dependent upon the chronological spacing of the head changes. By means of the digital-to-analog converter, this digital output signal is converted into an analog signal, for example into a voltage value. The output of the digital-to-analog converter is connected to the center tap of a write winding of the magnetic head whose ends are connected to the switch means. The direction in which the current is flowing through the write winding is determined with the assistance of the switch means to which the encoded information signal and the write clock signal are likewise supplied.

In a simple manner, the switch means can consist of a bistable flip-flop element which switches when the trailing edge of the write clock signal is pending and the encoded information signal is a binary "1". In contrast thereto, the counter counts the write clock signals when the encoded information signal is a binary "0". The digital-to-analog converter can consist of a transistor whose driven half lies between a first dc voltage and the center tap of the write winding. An input circuit which converts the digital counter reading of the counter into an analog voltage value is connected to the control input of the transistor. Accordingly, the input circuit expediently consists of a parallel connection consisting of a resistor and a capacitor disposed between a nodal point and a second dc voltage, of a respective resistor disposed between the nodal point and each output of the counter, and of a resistor disposed between a third dc voltage and the nodal point. The nodal point of the device is then connected to the control input of the transistor.

In order to determine a maximum counting value of the counter, the carry output of the counter is connected to its release input via an inverter. Thus, when the counter has reached its maximum value, the carry signal is employed to block the counter. This inhibit is only cancelled when the counter, with the assistance of the write clock signal and of the encoded information signal, has again been reset to its initial state.

BRIEF DESCRIPTION OF THE DRAWINGS

FIG. 1 is a pulse diagram illustrating the write clock signal, the encoded information signal, and the write current;

FIG. 2 is a fundamental block diagram of the device for generating the write current;

DESCRIPTION OF THE PREFERRED EMBODIMENTS

Figure 3:
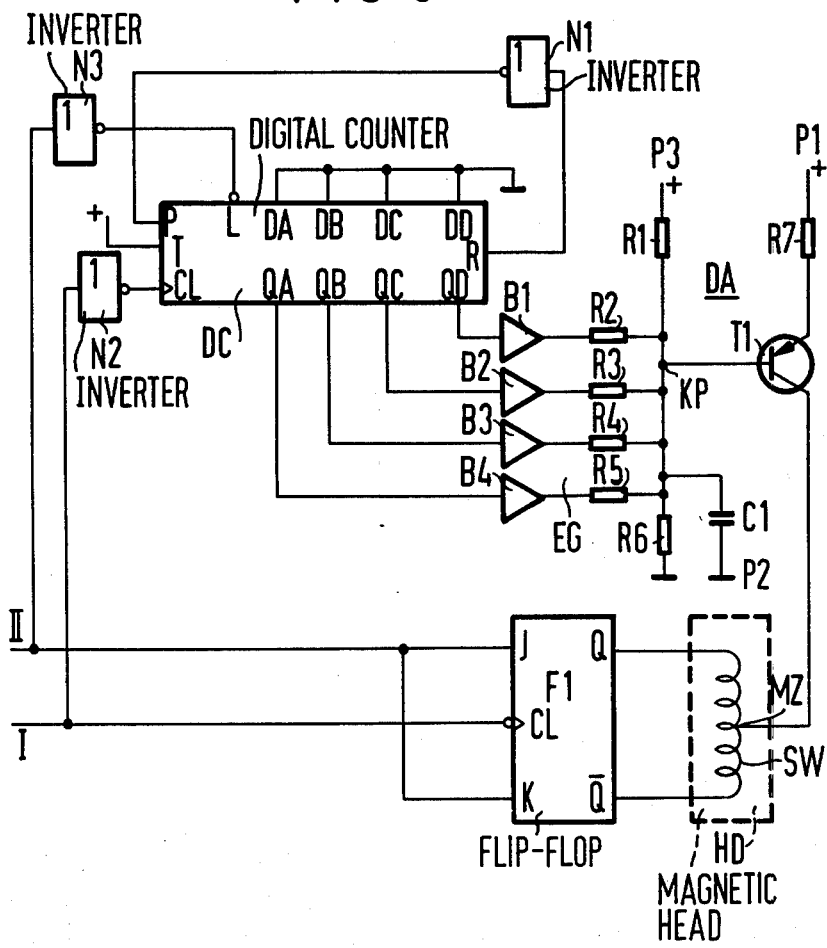
FIG. 3 is a detailed schematic diagram of the device of the invention.

Three pulse trains derive from FIG. 1 as illustrated, the first pulse train I shows the write clock signal, the second pulse train II shows the encoded information signal to be recorded on the recording medium, and the third pulse train III shows the write current. The pulse trains I and II are voltages which are recorded over time t. The pulse train III is a current which is recorded over time t.

The generation of the write clock signal ensues in a known manner, such as described, for example, in the aforementioned references. The encoded information signal II has a progression in order to be able to clearly show the shape of the write current. Therefore, the encoding method plays no part whatsoever here.

The write current III always has a head change in which it changes from a first current value to a second current value and vice versa, when an encoded information signal exists, i.e., is a binary "1", and the trailing edge of the write clock signal I occurs. Such head changes are shown in FIG. 1 at locations, A, B, C, D. These head changes are of such type that the magnetization of the recording medium is altered from one saturation condition into the other saturation condition. When a head change has been executed, then the amplitude of the write current does not remain at the first or, respectively, second current value. On the contrary, the amplitude of the write current is reduced in amount in stages. The plurality of stages between two successive head changes thereby depends on the chronological spacing of the two head changes. The closer the two head changes lie to one another in time, i.e. the greater the recording density on the recording medium is, then the lower is the number of stages of the write current. Accordingly, three possibilities are shown in FIG. 1.

Between the head changes A and B, the write current is reduced by three stages. Between the head changes B and C which lie at a greater distance from one another the write current is reduced by six stages. Between the next adjacent head changes C and D, the number of stages by which the amplitude of the write current is reduced in amount after a head change is reduced, the reduced number depending on the density of the successive encoded information signals, i.e. on the recording density on the recording medium. Accordingly, given encoded information signals which lie very far apart, the write current can drop stepwise down to zero. However, it is also possible to limit the stepwise reduction to a minimum value.

A fundamental circuit with which a write current according to FIG. 1 can be generated derives from FIG. 2. The write clock signal I and the encoded information signal II are supplied to a digital counter DC. The digital counter DC counts the number of write clock signals I between two successive, encoded information signals II. The digital counter reading of the counter DC is converted into an analog value, for example into a voltage value, with the assistance of a digital-to-analog converter DA. The analog value is supplied to a center tap MZ of a write winding SW of a magnetic head HD. The ends of the write winding SW are connected to the outputs of a switch means F1. The write clock signals I and the encoded information signals II are likewise supplied to the switch means. Whenever an information is to be written, and the trailing edge of a write clock signal occurs, the switch means changes over from one output to the other output. The result is that the current through the write winding SW flows either across the one winding half or across the other winding half. Accordingly, the magnetization state of the recording medium is altered. The stepwise reduction of the amplitude after every head change is achieved in that the voltage at the output of the digital-to-analog converter DA is correspondingly altered.

The more detailed structure of a device for generating the write current is illustrated in FIG. 3. The write clock signal L is supplied both to the counter DC as well as to the switch means F1 which is here designed as a bistable flip-flop element, for example as a JK flip-flop. Likewise, the encoded information signal II is supplied to the counter DC and to the bistable flip-flop element F1. When the encoded information signal is a binary "1", and the trailing edge of a write clock signal occurs, then the counter DC is reset to its initial value and the bistable flip-flop element F1 is switched. When, in contrast thereto, the encoded information signal is a binary "0" and a write clock signal occurs, then the counter DC counts the number of the write clock signals but, in contrast thereto, the bistable flip-flop element F1 remains uninfluenced.

In the sample embodiment, the counter DC has four outputs QA, QB, QC, QD. These outputs are connected to the digital-to-analog convert DA. This consists of an input circuit EG and of a transistor T1 connected to the input circuit EG. The input circuit EG is a network which essentially consists of resistors R and a capacitor C1. These are connected to one another at a nodal point KP. Each output QA through QD of the counter DC is respectively connected via a resistor R2 through R5 to the nodal point KP. Likewise, a parallel connection consisting of a resistor R6 and a capacitor C1 lies between a DC voltage P2 and the nodal point KP. Finally, a further resistor R1 is disposed between a further DC potential P3 and the nodal point KP. The nodal point KP is additionally connected to the base of the transistors T1. Buffers B1 through B4 can be disposed between the outputs QA through QD and the resistors R2 through R5.

With the assistance of the input circuit EG, the digital value of the counter DC is converted into a voltage at the nodal point KP which drives the transistor T1. As a function of this voltage value at the nodal point KP, the transistor T1 is driven to a greater or lesser degree. Accordingly, a larger or smaller current flows in the emitter-collector circuit of the transistor T1. The current of the transistor T1 flowing in the collector-emitter circuit is supplied to the center tap MZ of the write winding SW and, in accordance with the switch position of the bistable flip-flop element F1, flows over the one or the other half of the write winding SW of the magnetic head HD. The magnitude of the current is additionally determined by a resistor R7 lying in the emitter of the transistor T1, said resistor R7 being at a DC voltage P1.

Whenever the digital counter reading of the counter DC changes, the voltage at the nodal point KP changes accordingly and, thus, so does the voltage adjacent to the base of the transistor T1. The result is a change of the current through the write winding SW, i.e. of the write current. When a head change of the current is to be generated, the counter DC is reset to its initial value, for example 0. The voltage at the nodal point KP is then of such type that a maximum current flows through the transistor T1 and the write winding SW. When subsequently the counter DC counts up, the the voltage at the nodal point KP is changed stepwise; the amplitude of the write current flowing through the transistor T1 is correspondingly reduced, and thus the remanence in the recording medium is reduced.

The edge in the head changes of the write current is influenced by the capacitor C1. The number of steps of the write current depends on the number of write clock signals which lie between two encoded information signals. When, however, one must prevent the amplitude of the write current from being varied to 0 when two successive encoded information signals lie very far apart, then the carry output R of the counter DC is connected via an inverter element N1 to a release input P of the counter. Thus, when a carry signal occurs at the carry output R, the counter DC is blocked for further counting. I.e., the counter DC remains at its most recent value and, accordingly, a constant write current continues to flow. It is only when the next encoded information signal II occurs, i.e. a binary "1", that the counter DC is released and is reset to 0 with the trailing edge of the write clock signal. The further inverter elements N2 and N3 serve to apply the encoded information signals II and the write clock signals I to the corresponding inputs CL or, respectively, L of the counter DC with the proper polarity.

It must be noted that the method is independent of the encoding method employed. In a limiting case, given very high recording densities, it is possible that, after one head change, the next head change follows immediately, i.e. that no stepwise reduction of the amplitude of the write current occurs between two head changes. In the other limiting case, given very low recording densities, it is possible that the write current is reduced by steps to zero between two head changes.

Figure 4:
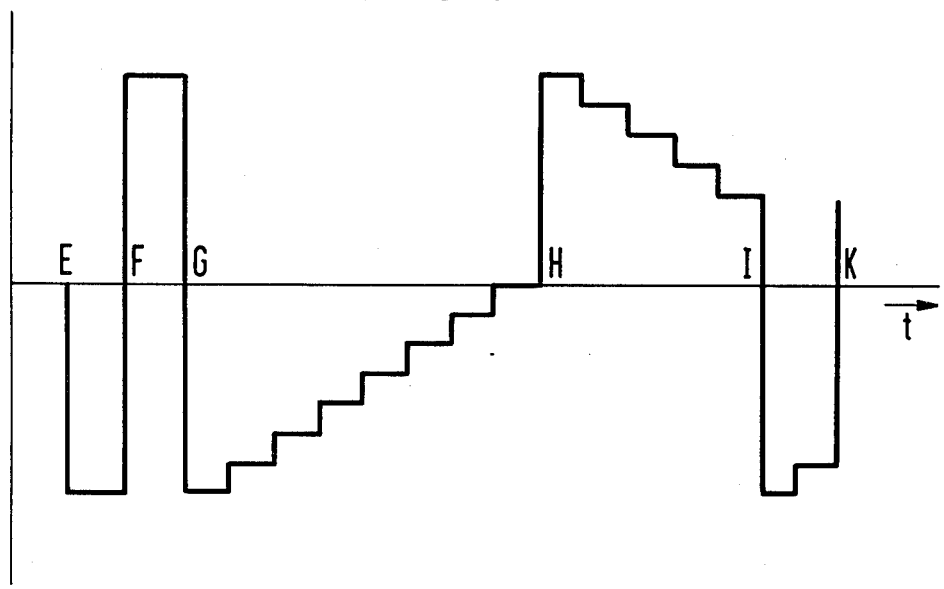
FIG. 4 a pulse diagram for the write current in limiting cases.

These limiting cases are illustrated in FIG. 4. Here, the write current is illustrated over time. Four instances are shown. The head changes E, F, G follow one another so quickly that the write current is not reduced stepwise between the head changes. In contrast thereto, the head changes G and H are so far apart that the write current is reduced to zero. In contrast thereto, the chronological spacing between two successive head changes between the head changes H, I, K is not of such type that one of the limiting cases exists.

The counter DC, as illustrated in the sample embodiment, can be formed of a commercially available dual-counter. It is also possible to employ a shift register as the counter DC, in which shift register a prescribed bit pattern is shifted by one stage upon occurrence of each clock pulse. For example, the bit pattern exhibits a binary value 1 at the output position at the output QA and exhibits the binary value 0 at the remaining locations. With the occurrence of each write clock signal I, this binary value 1 is respectively shifted by one stage toward the right. Expediently, the shift register exhibits more than four places and the resistors R2 through R5 are dimensioned in such manner that the desired progression of the write current III occurs. By means of employing the shift register as the counter DC, the progression of the write current III can be varied in a simple manner. For example, the progression of the write current III can be set in which the steps are not all of equal height. For example, the steps immediately after the changes at the points in time A through D can be respectively greater than before a change. This becomes particularly noticeable when the spacing between two changes is large. It is also possible to set a progression of the write current III in a simple manner which increases again before each change. This write current progression also proves to be expedient when a great chronological spacing exists between the changes.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A method for the magnetic recording of encoded digital information signals on a magnetic recording medium with the assistance of a magnetic head to which a write current is supplied, comprising the steps of: as a function of the encoded digital information signals, carrying out a step-like head change from a first current value above zero to a second current value below zero and vice versa; and after each head change, varying an amplitude of the write current in stepwise amounts from the first or second current value respectively until a subsequent step-like head change, wherein the number of steps depends on a chronological spacing of the two head changes from one another, and the varying amplitude between head changes not crossing zero.

2. A method according to claim 1 including the further step of reducing toward zero after each head change the amplitude of the write current a stepwise amount from the first or second current value respectively above or below zero.

3. A device for the magnetic recording of encoded digital information signals on a magnetic recording medium with the assistance of a magnetic head to which a write current is supplied, and wherein a head change is carried out from a first current to a second current as a function of the encoded information signals, comprising: a magnetic head having a write winding with a winding tap; a digital counter means to which the encoded information signals and a write clock signal are supplied and which emits a digital counting value at its output dependent upon a chronological spacing of the head changes; a digital-to-analog converter connected to the output of the counter means and whose output is connected to the winding tap of the write winding of the magnetic head; and a switch means whose output is connected to an end of the write winding and to whose inputs the encoded information signal and the write clock signal are supplied.

4. A device according to claim 3 wherein switch means comprises a bistable flip-flop element which switches when a trailing edge of the write clock signal is present at an input of the flip-flop element and the encoded information signal is a binary "1".

5. A device according to claim 3 wherein the digital counter means comprises a dual counter.

6. A device according to claim 3 wherein the digital counter means comprises a shift register.

7. A device according to claim 3 wherein the counter means switches into its initial state when the trailing edge of the write clock signal is present at its input and the encoded information signal is a binary "1"; and the counter means counts the write clock signals when the encoded information signal (II) is a binary "0".

8. A device according to claim 3 wherein the digital-to-analog converter comprises a transistor whose driven path lies between the first dc voltage and a center tap of the write winding and whose control input is connected to an input circuit means for converting the digital counter reading of the counter means into an analog voltage value.

9. A device according to claim 8 wherein the input circuit means comprises a parallel connection of a resistor and a capacitor connected between a nodal point and a further dc potential; respective resistors connected between the nodal point and each output of the counter means; and a resistor connected between a third dc voltage and the nodal point, whereby the nodal point is connected to the control input of the transistor.

10. A device according to claim 3 wherein the carry output of the counter means is connected to a release of the counter means via an inverter.

* * * * *